(12) United States Patent
Schroeder et al.

(10) Patent No.: US 6,834,893 B2
(45) Date of Patent: Dec. 28, 2004

(54) PEANUT FITTINGS FOR $CO_2$ AIR CONDITIONING SYSTEMS

(75) Inventors: Fred Georg Schroeder, Grosse Ile, MI (US); Eric W. Kesler, Northville, MI (US); Bruno Sima, Senov u N. Jicina (CZ); Marion Elisabeth Lorenz, Bergisch Gladbach (DE); David William Bertrand, Warren, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/237,825

(22) Filed: Sep. 9, 2002

(65) Prior Publication Data

US 2003/0080554 A1 May 1, 2003

Related U.S. Application Data

(60) Provisional application No. 60/335,134, filed on Nov. 1, 2001.

(51) Int. Cl.[7] ............................................... F16L 23/00
(52) U.S. Cl. ..................... 285/368; 285/374; 285/124.5
(58) Field of Search .......................... 285/124.5, 124.3, 285/374, 205, 368

(56) References Cited

U.S. PATENT DOCUMENTS

| | | | | |
|---|---|---|---|---|
| 214,812 A | * | 4/1879 | Clark | 285/368 |
| 1,202,502 A | * | 10/1916 | Forth | 285/368 |
| 1,906,826 A | * | 5/1933 | Smith et al. | 285/368 |
| 2,050,137 A | * | 8/1936 | Walsh | 285/374 |
| 2,183,895 A | * | 12/1939 | Reed | 285/374 |
| 2,202,492 A | | 5/1940 | Jacocks | |
| 2,444,380 A | | 6/1948 | Shimek | |
| 2,687,229 A | | 8/1954 | Laurent | |
| 2,864,630 A | | 12/1958 | Breitenstein | |
| 2,900,199 A | | 8/1959 | Logan | |
| 3,165,339 A | * | 1/1965 | Faccon | 285/368 |
| 3,524,662 A | | 8/1970 | Tolman et al. | |
| 3,834,744 A | | 9/1974 | Masatchi | |
| 4,214,779 A | | 7/1980 | Losell | |
| 4,413,845 A | | 11/1983 | Lawrence | |
| 4,611,831 A | | 9/1986 | Truchet | |
| 4,648,632 A | | 3/1987 | Hagner | |
| 5,149,147 A | | 9/1992 | Kastrup et al. | |
| 5,156,421 A | | 10/1992 | Chauvel | |
| 5,316,320 A | | 5/1994 | Breaker | |
| 5,393,108 A | | 2/1995 | Kerr | |
| 6,106,030 A | | 8/2000 | Nader et al. | |
| 6,161,880 A | | 12/2000 | Peppel | |
| 6,189,333 B1 | | 2/2001 | Cummings et al. | |
| 6,279,965 B1 | | 8/2001 | Kida | |
| 6,386,593 B1 | | 5/2002 | Slais et al. | |

FOREIGN PATENT DOCUMENTS

| | | |
|---|---|---|
| FR | 2764041 | 5/1997 |
| GB | 658084 | 10/1951 |
| GB | 2253667 A | 9/1992 |
| GB | 2283070 A | 4/1995 |
| WO | WO 00/20792 | 4/2000 |

* cited by examiner

*Primary Examiner*—David Bochna
(74) *Attorney, Agent, or Firm*—MacMillan, Sobanski & Todd, LLC

(57) ABSTRACT

A line fitting employs blocks secured together with a stud and a nut and having gaskets or seals which militate against permeation of $CO_2$ when subjected to high pressures and high temperatures, the seals are also resistant to decompression damage.

6 Claims, 5 Drawing Sheets

PEANUT FITTINGS FOR CO₂ AIR CONDITIONING SYSTEMS

CROSS-REFERENCE TO RELATED APPLICATION

This application claims the benefit of U.S. provisional patent application Ser. No. 60/335,134, filed Nov. 1, 2001.

FIELD OF THE INVENTION

The invention relates to a fitting for joining tubing in a vehicle air conditioning system and more particularly to a line fitting wherein the air conditioning system refrigerant is $CO_2$ and the fitting militates against permeation/leakage of $CO_2$ in the high pressures and high temperatures experienced during operation of the $CO_2$ air conditioning system.

BACKGROUND OF THE INVENTION

In assembly line manufacturing of vehicles, it is desirable that line fittings in an air conditioning system can be secured using a power nut driver rather than using a torque wrench. For this reason, peanut (i.e., block) fittings are often employed.

Conventional air conditioning systems have employed various refrigerants (e.g., Freon and R134a) having modest pressure and temperature ranges. Newer air conditioning and heat pump systems are being developed which use $CO_2$ as the refrigerant. The $CO_2$ systems operate at much higher pressures and temperatures. Fittings used for conventional systems typically employ rubber seals (e.g., O-rings) and cannot be used in $CO_2$ systems because of high permeation and decompression damage to the seals.

It would be desirable to produce a fitting for use in an air conditioning system which militates against permeation of $CO_2$ and decompression damage to seals in high pressure and high temperature systems.

SUMMARY OF THE INVENTION

Consistent and consonant with the present invention, a fitting for use in an air conditioning system which militates against permeation of $CO_2$ and decompression damage to seals in high pressure and high temperature systems has surprisingly been discovered. The fitting of the present invention employs blocks secured together using a stud, a nut, and gaskets or seals having a low permeation to $CO_2$, an ability to withstand high operating pressures and temperatures, and a resistance to decompression damage.

The block fitting for a $CO_2$ air conditioning system comprises:

a male block including a first aperture having a first end and a second end, the first end of the first aperture of the male block is adapted to receive a tube end therein, the male block including a female annular bore surrounding the first aperture to form a channel having a generally u-shaped cross-section;

a female block including a first aperture having a first end and a second end, the first end of the first aperture of the female block is adapted to receive a tube end therein, the female block including an annular collar surrounding the first aperture of the female block and adapted to be inserted into the channel formed by the female annular bore of the male block, at least one of an inner surface of the annular collar and an inner surface of the channel having an annular groove formed therein, the first aperture of the male block and the first aperture of the female block being substantially concentrically aligned;

a primary seal disposed adjacent and surrounding the second end of the first aperture of the male block and adjacent and surrounding the second end of the first aperture of the female block;

a secondary seal disposed in the annular groove of the annular collar of the female block, the secondary seal comprising a material with low permeation to $CO_2$; and a fastener adapted to engage the male block and the female block to sealingly engage the female annular bore of the male block and the annular collar of the female block.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENTS

Figure 1:
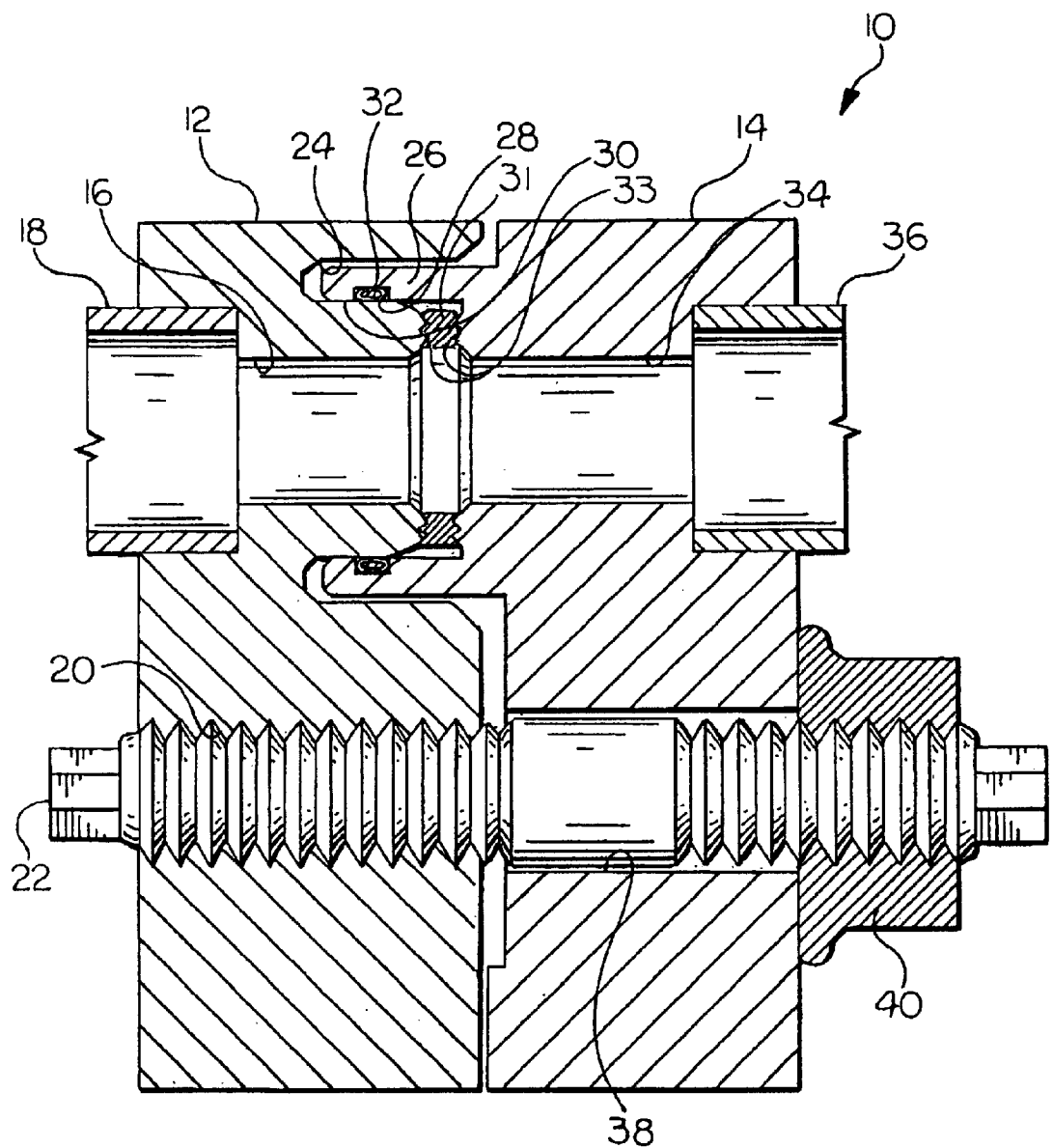
FIG. 1 is a sectional elevation view incorporating the features of the present invention.

Referring now to the drawings, and particularly FIG. 1, there is shown generally at 10 a block or peanut fitting incorporating the features of the invention. The block fitting 10 includes a male block portion 12 and a female block portion 14. The male block 12 includes a first aperture 16 having a generally circular cross section and one end adapted to receive a tube or conduit 18. It is desirable, although not critical, to have a press fit between the tube 18 and the wall forming the first aperture 16. Splines formed on the wall which forms the first aperture 16 can also be used to accomplish the desired interference fit. The tube 18 is joined to the male block 12 by any conventional method such as by brazing or welding, for example, to form a leak free connection. The male block 12 includes a second aperture 20 adapted to receive a stud 22.

A female annular bore 24 is formed in the male block 12 and is adapted to receive an annular collar 26 formed on the female block 14. An annular groove 28 is formed on an inner wall 30 of the collar 26. The groove 28 is adapted to receive seal 32, which serves as a secondary seal. It is understood that the groove 28 could also be formed on a wall of the female annular bore 24 or an outer wall of the collar 26. A flat washer 31 is disposed between the male block 12 and the female block 14 adjacent the first aperture 16 to serve as a primary seal. Sealing beads 33 are formed on opposing surfaces of the male block 12 and the female block 14 to abut the flat washer 31. In the embodiment shown, a tin-coated copper flat washer 31 is used. However, it is understood that other conventional $CO_2$ resistant sealing materials could be used such as laminated tetrafluoroethylene, rubber-coated aluminum, pewter, babbit, bronze, nickel, polyamide, aluminum, and other metal coated or rubber-coated metals, for example. Other sealing bead 33 shapes can be used such as curved radius, square, or other shapes and can employ one or more beads 33.

The female block 14 includes a first aperture 34 having a generally circular cross section and one end adapted to receive a tube or conduit 36. The tube 36 is joined to the female block 14 by any conventional method such as by brazing or welding, for example, to form a leak free connection. The female block 14 includes a second aperture 38 adapted to receive the stud 22. The stud 22 is inserted through the second aperture 38 of the female block 14 and the second aperture 20 of the male block 12. A nut 40 threadingly engages the stud 22 to tightly hold the male block 12 adjacent the female block 14 and hold the first aperture 16 of the male block 12 adjacent and substantially concentric with the first aperture 34 of the female block 14. It is understood that other fasteners could be used without departing from the scope and spirit of the invention.

Figure 2:
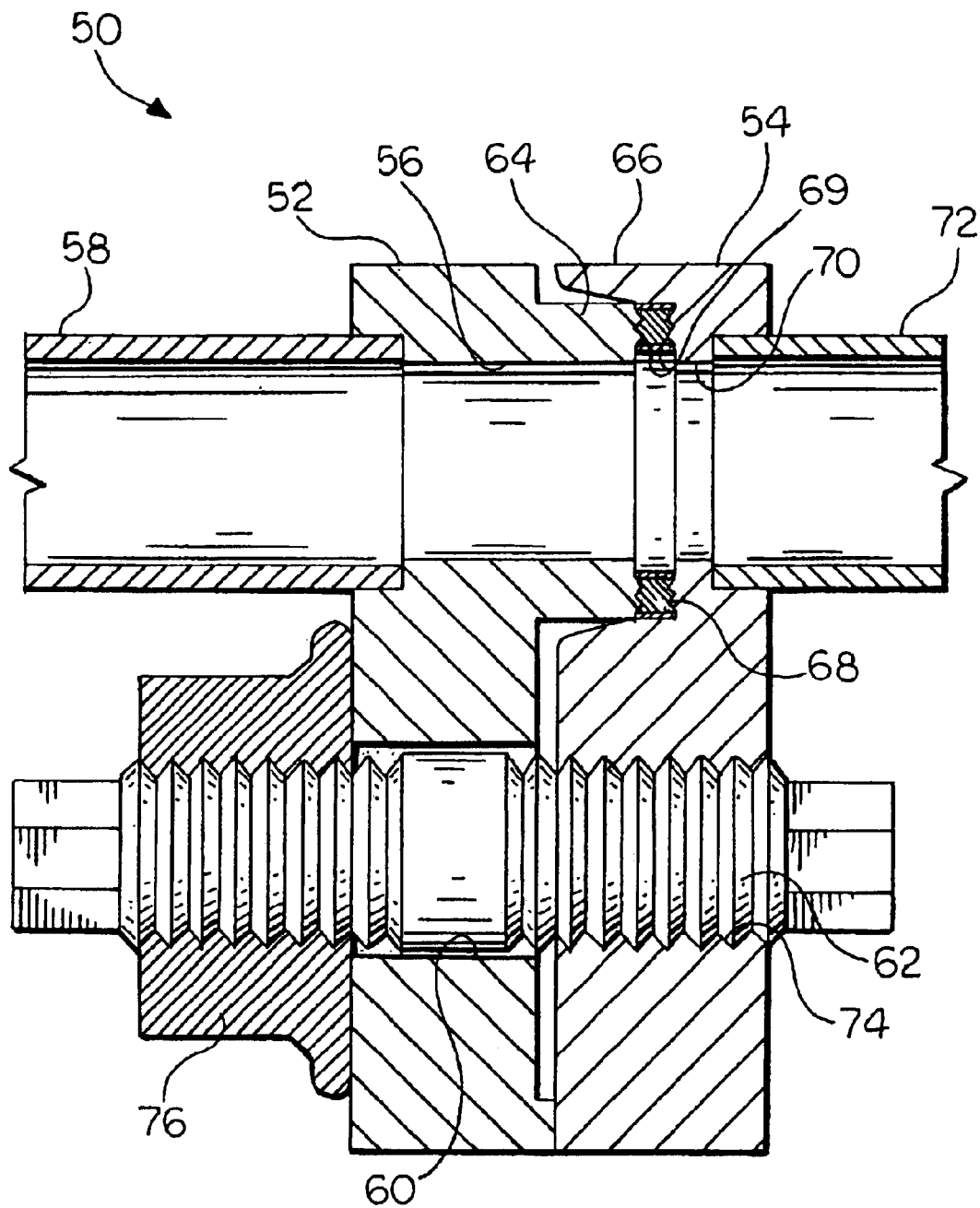
FIG. 2 is a sectional elevation view of an alternate embodiment of the present invention.

Referring now to FIG. 2, there is shown generally at 50 a block or peanut fitting incorporating a second embodiment of the present invention. The block fitting 50 includes a male block portion 52 and a female block portion 54. The male block 52 includes a first aperture 56 having a generally circular cross section and one end adapted to receive a tube or conduit 58. It is desirable, although not critical, to have a press fit between the tube 58 and the wall forming the first aperture 56. Splines formed on the wall forming the first aperture 56 can also be used to accomplish the desired interference fit. The tube 58 is joined to the male block 52 by any conventional method such as by brazing or welding, for example, to form a leak free connection. The male block 52 includes a second aperture 60 adapted to receive a stud 62.

An annular shoulder 64 is formed on the male block 52 and is adapted to receive an annular collar 66 formed on the female block 54. A ring seal or washer 68 is disposed within the annular collar 66 of the female block 54 and abuts the end of the shoulder 64 of the male block 52. Sealing beads 69 are formed on opposing surfaces of the male block 52 and the female block 54 to abut the seal 68. In the embodiment shown, a tin-coated copper seal 68 is used. However, it is understood that other conventional $CO_2$ resistant sealing materials could be used such as laminated tetrafluoroethylene, rubber-coated aluminum, pewter, babbit, bronze, nickel, polyamide, aluminum, and other metal coated or rubber-coated metals, for example. Other seal 68 cross sections can also be used without departing from the scope and spirit of the invention such as rectangular, triangular, and oval or various other radial curves, for example. Other sealing bead 69 shapes can be used such as curved radius, square, or other shapes and can employ one or more beads 69.

The female block 54 includes a first aperture 70 having a generally circular cross section and one end adapted to receive a tube or conduit 72. The tube 72 is joined to the female block 54 by any conventional method such as by brazing or welding, for example, to form a leak free connection. The female block 54 includes a second aperture 74 adapted to receive the stud 62. The stud 62 is inserted through the second aperture 60 of the male block 52 and the second aperture 74 of the female block 54. A nut 76 threadingly engages the stud 62 to tightly hold the male block 52 adjacent the female block 54 and hold the first aperture 56 of the male block 52 adjacent and substantially concentric with the first aperture 70 of the female block 54. It is understood that other fasteners could be used without departing from the scope and spirit of the invention.

Figure 3:
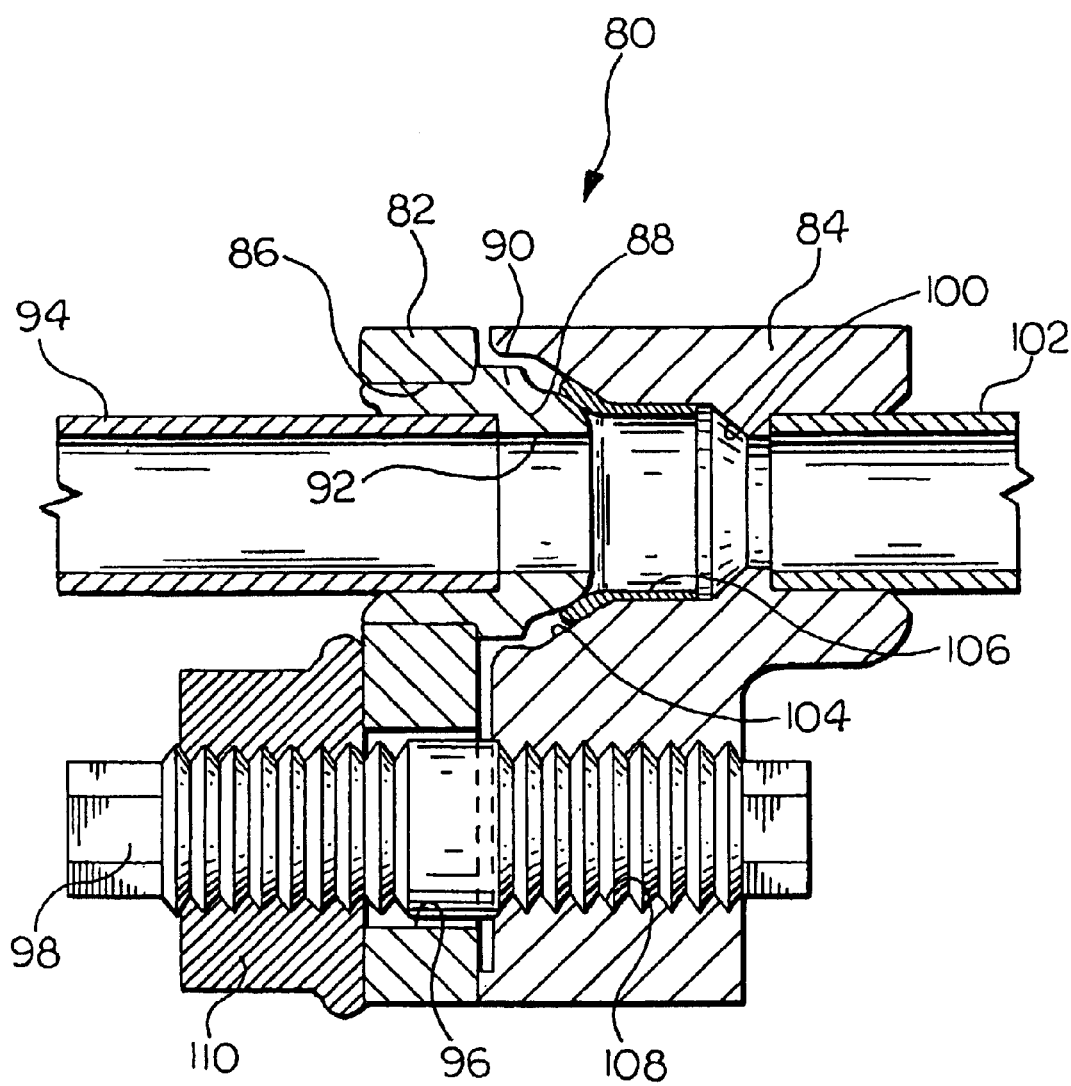
FIG. 3 is a sectional elevation view of an alternate embodiment of the present invention.

Referring now to FIG. 3, there is shown generally at 80 a block or peanut fitting incorporating a third embodiment of the present invention. The block fitting 80 includes a clamping block portion 82 and a female block portion 84. The clamping block 82 includes a first aperture 86 with a generally circular cross section and adapted to receive a hollow tube end form 88. The tube end form 88 has an annular shoulder 90 formed on an outer surface thereof. A central aperture 92 of the tube end form 88 has one end adapted to receive a tube or conduit 94. It is desirable, although not critical, to have a press fit between the tube 94 and the wall forming the central aperture 92. Splines formed on the wall forming the central aperture 92 can also be used to accomplish the desired interference fit. The tube 94 is joined to the tube end form 88 by any conventional method such as by brazing or welding, for example, to form a leak free connection. The clamping block portion 82 includes a second aperture 96 adapted to receive a stud 98.

The female block 84 includes a first aperture 100 having a generally circular cross section and a first end adapted to receive a tube or conduit 102. The tube 102 is joined to the female block 100 by any conventional method such as by brazing or welding, for example, to form a leak free connection. A second end of the first aperture 100 is adapted to receive the tube end form 88. The second end of the first aperture 100 has a sloped inner surface 104 adapted have a flare washer or seal 106 inserted therein and to abut the end of the tube end form 88. In the embodiment shown, a tin-coated copper seal is used. However, it is understood that other conventional $CO_2$ resistant sealing materials could be used such as laminated tetrafluoroethylene, rubber-coated aluminum, pewter, and other rubber-coated metals, for example. Additionally, in the embodiment shown, the slope angle of the sloped inner surface is approximately 37 degrees. It is understood that other slope angles could be used without departing from the scope and spirit of the invention.

The female block 84 includes a second aperture 108 adapted to receive the stud 98. The stud 98 is inserted through the second aperture 96 of the clamping block 82 and the second aperture 108 of the female block 84. A nut 110 threadingly engages the stud 98 to urge the clamping block 82 and the tube end form 88 adjacent the female block 84 and form a tight seal. Hence, the central aperture 92 of the tube end form 88 is held adjacent and substantially concentric with the first aperture 100 of the female block 84. It is understood that other fasteners could be used without departing from the scope and spirit of the invention.

Figure 4:
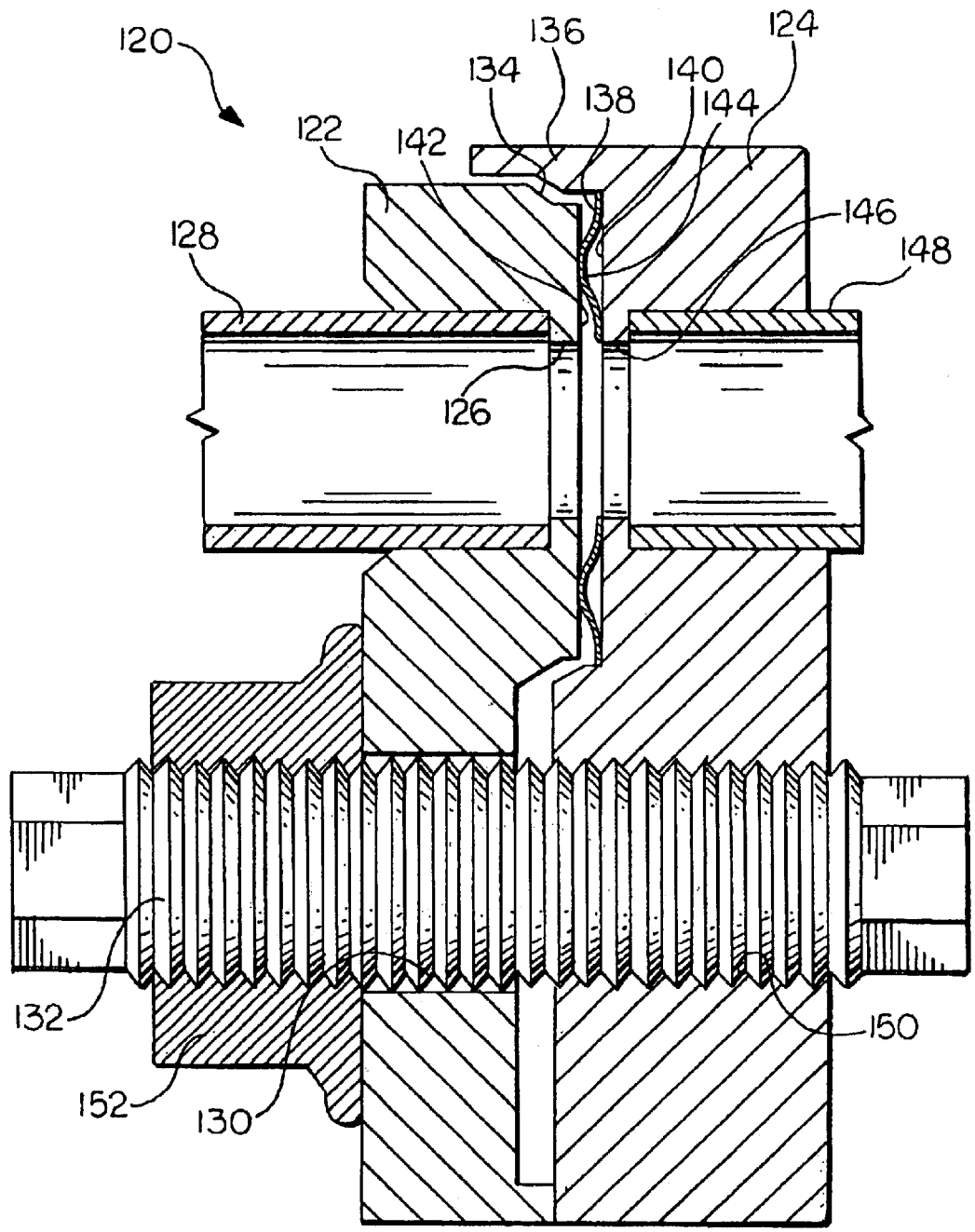
FIG. 4 is a sectional elevation view of an alternate embodiment of the present invention.

Referring now to FIG. 4, there is shown generally at 120 a block or peanut fitting incorporating a fourth embodiment of the present invention. The block fitting 120 includes a male block portion 122 and a female block portion 124. The male block 122 includes a first aperture 126 having a generally circular cross section and one end adapted to receive a tube or conduit 128. It is desirable, although not critical, to have a press fit between the tube 128 and the wall forming the first aperture 126. Splines formed on the wall forming the first aperture 126 can also be used to accomplish the desired interference fit. The tube 128 is joined to the male block 122 by any conventional method such as by brazing or welding, for example, to form a leak free connection. The male block 122 includes a second aperture 130 adapted to receive a stud 132.

A tapered end surface 134 is formed on the male block 122 and is adapted to be received in an annular collar 136 formed on the female block 124. A seal 138 is disposed on a facing surface 140 of the female block 124 and abuts a facing surface 142 of the male block 122. The seal 138 has a sealing bead 144 disposed thereon. In the embodiment shown, a rubber coated metal seal is used. However, it is understood that other conventional $CO_2$ resistant sealing materials could be used such as laminated tetrafluoroethylene, tin-coated copper, and pewter, for example.

The female block 124 includes a first aperture 146 having a generally circular cross section and one end adapted to receive a tube or conduit 148. The tube 148 is joined to the female block 124 by any conventional method such as by brazing or welding, for example, to form a leak free connection. The female block 124 includes a second aperture 150 adapted to receive the stud 132. The stud 132 is inserted through the second aperture 130 of the male block 122 and threadingly engaged in the second aperture 150 of the female block 124. A nut 152 threadingly engages the stud 132 to tightly hold the male block 122 adjacent the female block 124 and hold the first aperture 126 of the male block 122 adjacent and substantially concentric with the first aperture 146 of the female block 124. It is understood that other fasteners could be used without departing from the scope and spirit of the invention.

Figure 5:
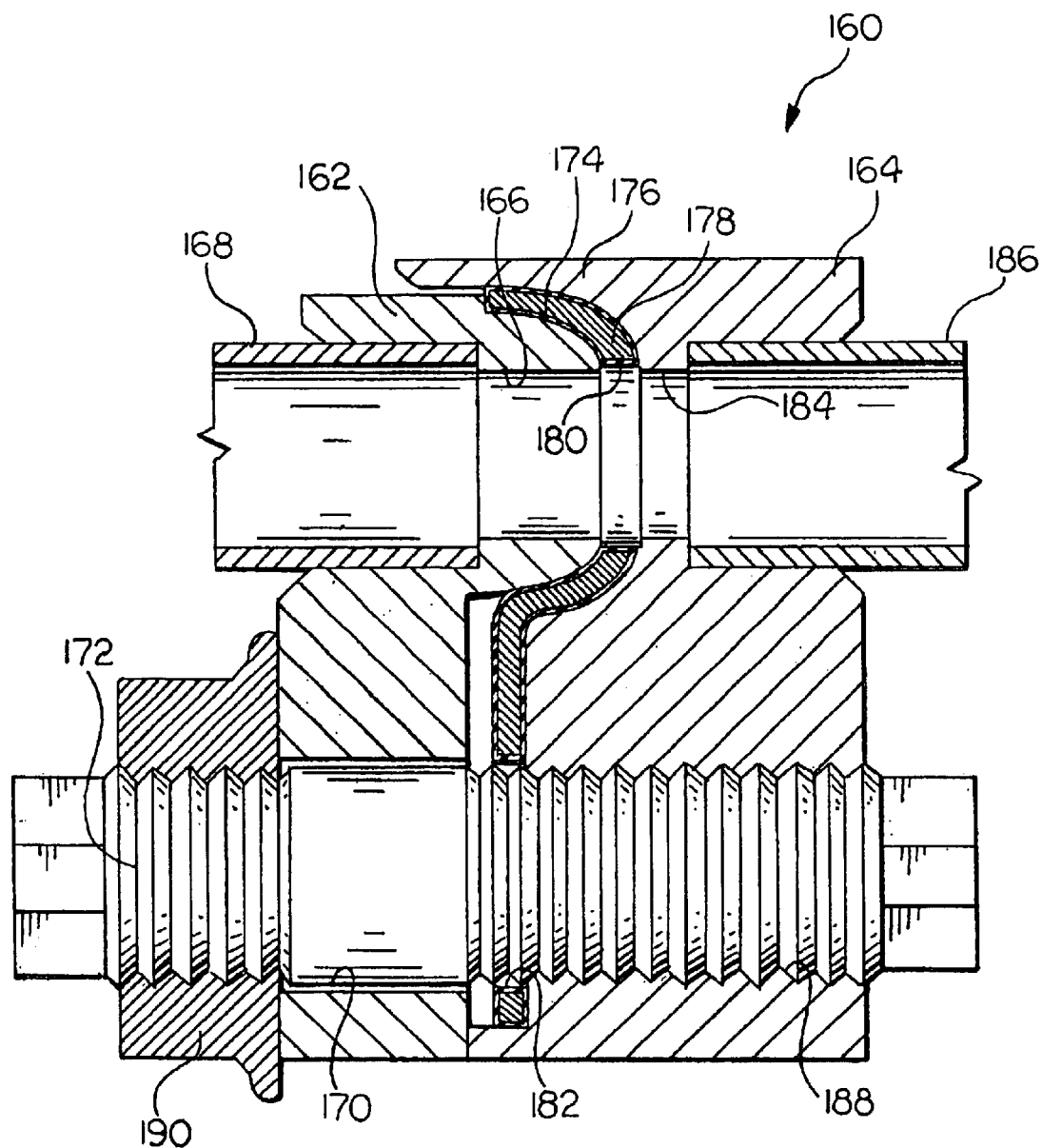
FIG. 5 is a sectional elevation view of an alternate embodiment of the present invention.

Referring now to FIG. 5, there is shown generally at 160 a block or peanut fitting incorporating a fifth embodiment of the present invention. The block fitting 160 includes a male block portion 162 and a female block portion 164. The male block 162 includes a first aperture 166 having a generally circular cross section and one end adapted to receive a tube or conduit 168. It is desirable, although not critical, to have a press fit between the tube 168 and the wall forming the first aperture 166. Splines formed on the wall forming the first aperture 166 can also be used to accomplish the desired interference fit. The tube 168 is joined to the male block 162 by any conventional method such as by brazing or welding, for example, to form a leak free connection. The male block 162 includes a second aperture 170 adapted to receive a stud 172.

A generally spherical end surface 174 is formed on the male block 162 and is adapted to be received in a generally spherical socket 176 formed on the female block 164. A seal 178 is disposed between the spherical end surface 174 and the spherical socket 176. The seal 178 also extends to essentially cover the full interface area between the male block 162 and the female block 164. The seal 178 has a first aperture 180 and a second aperture 182 formed therein. In the embodiment shown, a rubber coated metal seal is used. However, it is understood that other conventional $CO_2$ resistant sealing materials could be used such as laminated tetrafluoroethylene, tin coated copper, polyimide, rubber, and soft metal, for example.

The female block 164 includes a first aperture 184 having a generally circular cross section and one end adapted to receive a tube or conduit 186. The tube 186 is joined to the female block 164 by any conventional method such as by brazing or welding, for example, to form a leak free connection. The female block 164 includes a second aperture 188 adapted to receive the stud 172. The stud 172 is inserted through the second aperture 170 of the male block 162, the second aperture 182 of the seal 178, and the second aperture 188 of the female block 164. A nut 190 threadingly engages the stud 172 to tightly hold the male block 162 adjacent the female block 164 having the seal 178 sandwiched therebetween. The first aperture 166 of the male block 162 is also held adjacent and substantially concentric with the first aperture 180 of the seal 178 and the first aperture 184 of the female block 164. The radius of the spherical portion of the seal 178 may be slightly larger than that of the spherical end surface 174 to provide a good fit and good sealing. The spherical shape allows the male block 162 and the female block 164 to be slightly misaligned during assembly and still achieve a good seal as the spherical surface is naturally guided to nest properly when the nut 190 is secured. It is understood that other fasteners could be used without departing from the scope and spirit of the invention.

The assembly and operation of the embodiments of the invention will now be described. To assemble the embodiment of the invention illustrated in FIG. 1, the tube 18 is axially slidably inserted in the first aperture 16 of the male block 12 and secured. The tube 36 is axially slidably inserted in the first aperture 34 of the female block 14 and secured. The stud 22 is then threadingly engaged with the second aperture 20 of the male block 12. The flat washer 31 is placed within the annular collar 26 formed on the female block 14 and generally concentric with the first aperture 16 of the male black 12 and the first aperture 34 of the female block 14. Then, the seal 32 is placed in the annular channel 28. The male block 12 and the female block 14 are moved adjacent one another allowing the stud 22 to slide through the second aperture 38 of the female block 14. The nut 40 is then engaged with the threaded portion of the stud 22 and tightened to sealingly engage the male block 12 and the female block 14. Once assembled, the male block 12 and the female block 14 cooperate with the flat washer 31 and the seal 32 to create a sealed, tight fit and militate against relative axial and rotational movement between the tube 18 and the tube 36. A sealing pressure of about 7200 psi (50 Mpa) at 8 Nm torque, with 600 lbf clamp load has been achieved. This embodiment has resulted in successful leak testing using $CO_2$ at 15 Mpa and 180 degrees Celsius.

To assemble the embodiment of the invention illustrated in FIG. 2, the tube 58 is axially slidably inserted in the first aperture 56 of the male block 52 and secured. The tube 72 is axially slidably inserted in the first aperture 70 of the female block 54 and secured. The stud 62 is then threadingly engaged with the second aperture 74 of the female block 54. Then, the seal 68 is press fit into the annular collar 66. The male block 52 and the female block 54 are moved adjacent one another allowing the stud 62 to slide through the second aperture 60 of the male block 52. The nut 76 is then engaged with the threaded portion of the stud 62 and tightened to sealingly engage the male block 52 and the female block 54. Once assembled, the male block 52 and the female block 54 cooperate with the seal 68 to create a sealed, tight fit and militate against relative axial and rotational movement between the tube 58 and the tube 72. The male block 52 and the female block 54 are typically clamped with about 600 lbf clamping load on the seal 68 resulting in about 9700 psi (66 Mpa) of sealing pressure with 8 Nm of torque on the nut. This embodiment has resulted in a successful leak test using $CO_2$ at 15 Mpa and 180 degrees Celsius.

For the embodiment of the invention illustrated in FIG. 3, the tube 94 is axially slidably inserted in the central aperture 92 of the tube end form 88 and secured. The tube 102 is axially slidably inserted in the first aperture 100 of the female block 84 and secured. Then, the flare washer 106 is placed within the sloped inner surface 104. The tube end form 88 is inserted into the first aperture 86 of the clamping block 82 and the clamping block 82 and the female block 84 are moved adjacent one another. Then, the stud 98 is inserted into the second aperture 96 of the clamping block 82 and threadingly engaged with the second aperture 108 of the female block 84. The nut 110 is then engaged with the threaded portion of the stud 98 and tightened to sealingly engage the tube end form 88 and the female block 84. Once assembled, the clamping block 82, the tube end form 88, and the female block 84 cooperate with the flare washer 106 to create a sealed, tight fit and militate against relative axial and rotational movement between the tube 94 and the tube 102. Using a tin coated copper washer with this embodiment has resulted in a successful leak test using helium at 900 psig.

To assemble the embodiment of the invention illustrated in FIG. 4, the tube 128 is axially slidably inserted in the first aperture 126 of the male block 122 and secured. The tube 148 is axially slidably inserted in the first aperture 146 of the female block 124 and secured. Then, the seal 138 is placed adjacent the facing surface 140 of the female block 124 within the annular collar 136. The male block 122 and the female block 124 are then moved adjacent one another. The stud 132 is inserted into the second aperture 130 of the male block 122 and threadingly engaged with the second aperture 150 of the female block 124. The nut 152 is then engaged with the threaded portion of the stud 132 and tightened to sealingly engage the male block 122 and the female block 124. Once assembled, the male block 122 and the female block 124 cooperate with the seal 138 to create a sealed, tight fit and militate against relative axial and rotational movement between the tube 128 and the tube 148. A sealing pressure of about 7200 psi (50 Mpa) at 8 Nm torque, with 600 lbf clamp load has been achieved. This embodiment has resulted in successful leak testing using helium at 900 psig.

For the assembly of the embodiment of the invention illustrated in FIG. 5, the tube 168 is axially slidably inserted in the first aperture 166 of the male block 162 and secured. The tube 186 is axially slidably inserted in the first aperture 184 of the female block 164 and secured. Then, the seal 178 is placed within the spherical socket 176. The male block 162 and the female block 164 are moved adjacent one another to trap the seal 178 therebetween. The stud 172 is then inserted into the second aperture 170 of the male block 162, the second aperture 182 of the seal 178, and threadingly engages the second aperture 188 of the female block 164. The nut 190 is then engaged with the threaded portion of the stud 172 and tightened to sealingly engage the male block 162 and the female block 164. Once assembled, the male block 162 and the female block 164 cooperate with the seal 178 to create a sealed, tight fit and militate against relative axial and rotational movement between the tube 168 and the tube 186. Use of this embodiment has resulted in successful leak testing using helium at 900 psig with a torque on the nut 190 of approximately 20 Nm.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A block fitting for a $CO_2$ air conditioning system comprising:

a male block including a first aperture having a first end and a second end, the first end of the first aperture of said male block adapted to receive a tube end therein, said male block including a female annular bore surrounding the first aperture to form a channel having a generally u-shaped cross-section;

a female block including a first aperture having a first end and a second end, the first end of the first aperture of said female block adapted to receive a tube end therein, said female block including an annular collar surrounding the first aperture of said female block and adapted to be inserted into the channel formed by the female annular bore of said male block, at least one of an inner surface of the annular collar and an inner surface of the channel having an annular groove formed therein, the first aperture of said male block and the first aperture of said female block being substantially concentrically aligned;

a primary seal disposed adjacent and surrounding the second end of the first aperture of said male block and adjacent and surrounding the second end of the first aperture of said female block;

a secondary seal disposed in the annular groove of the annular collar of said female block, said secondary seal comprising a material with low permeation to $CO_2$; and a fastener adapted to engage said male block and said female block to sealingly engage the female annular bore of said male block and the annular collar of said female block.

2. The fitting according to claim 1, wherein said primary seal material is tin coated copper.

3. The fitting according to claim 1, wherein said primary seal material is rubber-coated metal.

4. The fitting according to claim 1, wherein said primary seal material is laminated tetrafluoroethylene.

5. The fitting according to claim 1, wherein said primary seal material is pewter.

6. The fitting according to claim 1, wherein at least one of said male block and said female block has at least one sealing bead formed thereon to abut said primary seal.

* * * * *